G. W. SMITH & C. F. HENIS.
MAGNETIC WATER GAGE.
No. 44,118.          Patented Sept. 6, 1864.
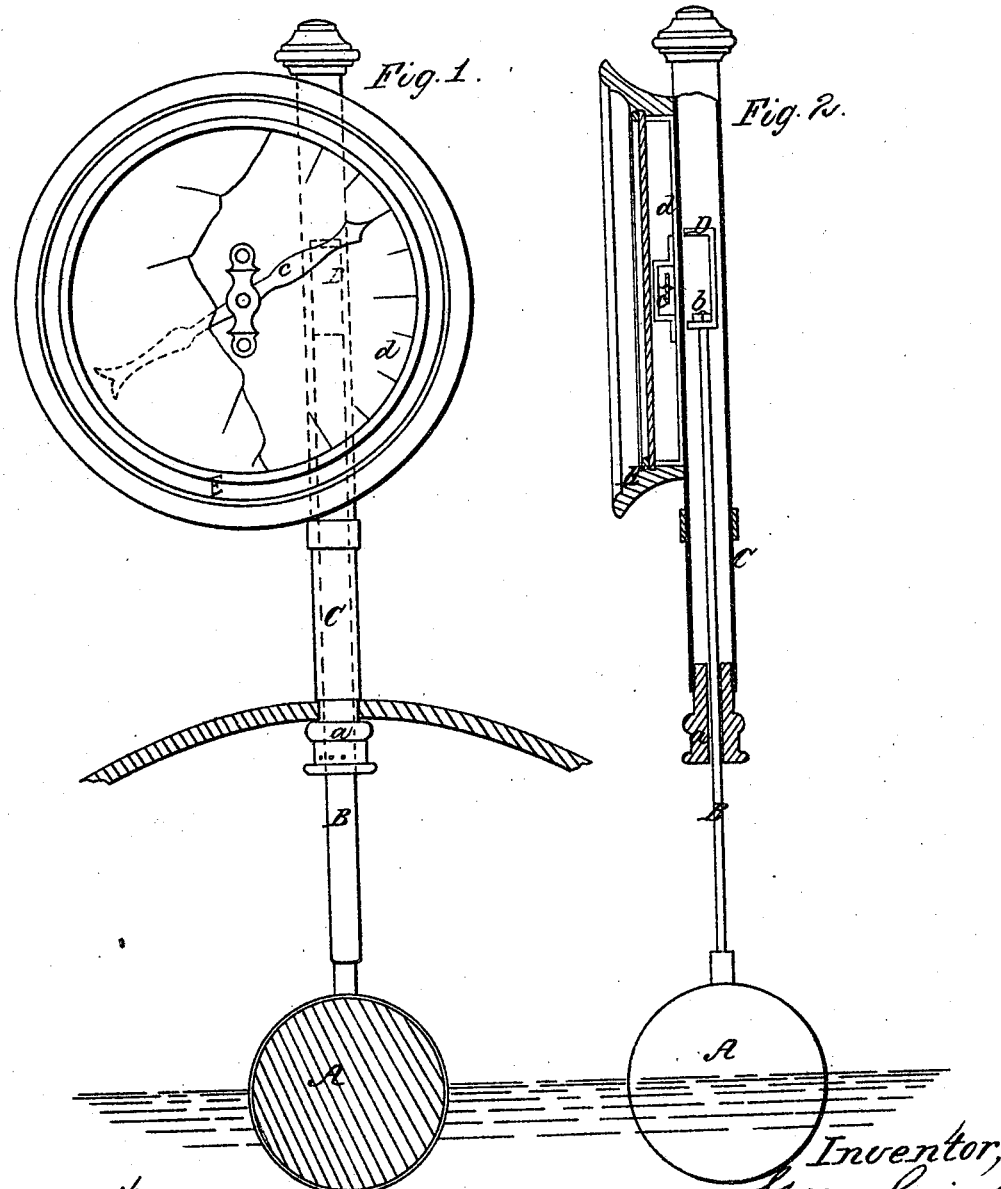

UNITED STATES PATENT OFFICE.

GEORGE W. SMITH AND CHARLES F. HENIS, OF CINCINNATI, OHIO.

IMPROVEMENT IN MAGNETIC WATER-GAGES.

Specification forming part of Letters Patent No. 44,118, dated September 6, 1864.

*To all whom it may concern:*

Be it known that we, GEORGE W. SMITH and CHARLES F. HENIS, of Cincinnati, in the county of Hamilton and State of Ohio, have invented a new and Improved Magnetic Water-Gage; and we do hereby declare that the following is a full, clear, and exact description thereof, which will enable others skilled in the art to make and use the same, reference being had to the accompanying drawings, forming part of this specification, in which—

Figure 1 represents a sectional front elevation of our invention. Fig. 2 is a transverse vertical section of the same.

Similar letters of reference indicate like parts.

This invention consists in the employment or use of a vertically-moving magnet in combination with a vertical tube and with a revolving index-hand and dial and with a float in such a manner that by the action of the float on the magnet the position the water has in the boiler is indicated with perfect accuracy, the index-hand being caused to follow the motions of the magnet.

The invention consists, also, in the use of a wooden float coated by electro-magnetic process with copper in such a manner that the wood is protected against the destroying agency of the water or steam, and the collapsing of the float is obviated.

A represents a float made of wood and covered by electro-magnetic process with a thin shell of copper to protect the wood against the action of water and steam. This float is secured to the lower end of a vertical rod, B, which extends up into the tube C, and bears on its upper end the magnet D.

The tube C is secured in the top of a steam-boiler in a vertical position by means of a nut, a, which screws in the lower end of the tube and draws the same down tight against the outer surface of the boiler-plate.

Suitable packing prevents the escape of steam.

The nut a forms the guide for the rod B, which is flat or otherwise so formed that it will not turn in the socket of the nut, and its upper end is secured to the U-shaped magnet by means of a nut, b, or in any other suitable manner.

The upper end of the tube C is firmly closed, and the magnet moves up and down thereon with perfect freedom. Said tube of course must be made of brass, copper, or other material which has no magnetic properties and sufficiently strong to withstand the pressure of the steam. Secured to its upper end is the case E, which forms the bearings for the arbor of the index-hand C. This index-hand is made of steel or other suitable material having magnetic properties, or its points may be also magnetized to increase its attraction to the magnet D, and it moves over a dial, d, which is fastened in the case E.

Suitable marks on the dial indicate the height of the water in the boiler, and the engineer is thus able to tell at a glance at any moment the exact position of the water.

This gage can be readily applied to boilers of any description, and by placing the rod carrying the float in a vertical position, the condensed water is free to run back into the boiler, and the magnet is not liable to be blocked up by dirt or impurities accumulating in said tube, and, furthermore, by unscrewing the nut a free access can be had to the magnet and to the tube C for the purpose of cleansing the same whenever it should be desirable; furthermore, the rod B is perfectly guided by the tube C, which may be made to extend down into the boiler, if desired, and our gage can be used on marine boilers and locomotives, as well as on stationary engines.

We claim as new and desire to secure by Letters Patent—

The vertical tube C and magnet D, in combination with the float A and revolving index c, constructed and operated as and for the purpose specified.

GEO. W. SMITH.
CHR. F. HENIS.

Witnesses:
W. CHEASEY,
JACOB S. LOWRY.